United States Patent
Peng et al.

(10) Patent No.: US 11,680,117 B2
(45) Date of Patent: Jun. 20, 2023

(54) POLYETHYLENES AND PROCESSES FOR PRODUCING POLYETHYLENES

(71) Applicant: ExxonMobil Chemical Patents Inc., Baytown, TX (US)

(72) Inventors: Haiqing Peng, Sugar Land, TX (US); Henri A. Lammens, Antwerp (BE); Timothy S. McCracken, Beaumont, TX (US); Arthur G. Voepel, Beaumont, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 186 days.

(21) Appl. No.: 17/223,556

(22) Filed: Apr. 6, 2021

(65) Prior Publication Data

US 2021/0324117 A1    Oct. 21, 2021

Related U.S. Application Data

(60) Provisional application No. 63/010,839, filed on Apr. 16, 2020.

(51) Int. Cl.
| | | |
|---|---|---|
| *C08F 110/02* | (2006.01) | |
| *B29C 39/02* | (2006.01) | |
| *B29C 39/10* | (2006.01) | |
| *B29C 39/00* | (2006.01) | |
| *B29K 23/00* | (2006.01) | |

(52) U.S. Cl.
CPC .......... *C08F 110/02* (2013.01); *B29C 39/003* (2013.01); *B29C 39/025* (2013.01); *B29C 39/10* (2013.01); *B29K 2023/0608* (2013.01)

(58) Field of Classification Search
CPC ....... C08F 10/02; C08F 110/02; C08F 210/02
See application file for complete search history.

(56) References Cited

U.S. PATENT DOCUMENTS

| | | | |
|---|---|---|---|
| 6,914,113 B2 * | 7/2005 | McLeod | C08J 5/18 525/387 |
| 7,820,776 B2 | 10/2010 | Neuteboom et al. | |
| 9,120,880 B2 | 9/2015 | Zschoch et al. | |
| 9,238,700 B2 | 1/2016 | Littmann et al. | |
| 9,593,177 B2 | 3/2017 | Nummila-Pakarinen et al. | |
| 2008/0090983 A1 * | 4/2008 | Satoh | C08F 10/02 526/348.2 |
| 2011/0172322 A1 * | 7/2011 | Michel | C08F 210/16 526/348 |
| 2012/0053304 A1 * | 3/2012 | Fouarge | B01J 8/0015 526/64 |
| 2014/0163181 A1 * | 6/2014 | Yang | C08L 23/00 526/64 |

FOREIGN PATENT DOCUMENTS

WO        20150166297        11/2015

\* cited by examiner

*Primary Examiner* — Mark S Kaucher
(74) *Attorney, Agent, or Firm* — ExxonMobil Technology and Engineering Company—Chemicals

(57) ABSTRACT

The present disclosure provides processes for producing polyethylene resins. In at least one embodiment, a polyethylene has: a density of from about 0.91 g/cm³ to about 0.94 g/cm³; a value of Mz of about 1,500,000 g/mol or greater; and a ratio of Mz to Mw of about 7 or greater. A process includes introducing a first feed stream having ethylene monomer and a first free radical initiator to a first inlet of a first reaction zone, where the first reaction zone has a first inlet temperature. The process further includes introducing a second feed stream having ethylene monomer and a second free radical initiator to a second inlet of a second reaction zone, where the second reaction zone has a second inlet temperature that is the same or different than the first inlet temperature.

4 Claims, 5 Drawing Sheets

POLYETHYLENES AND PROCESSES FOR PRODUCING POLYETHYLENES

CROSS REFERENCE TO RELATED APPLICATION

This application claims the benefit of U.S. Provisional Application 63/010,839 filed Apr. 16, 2020 entitled "Polyethylenes And Processes For Producing Polyethylenes", the entirety of which is incorporated by reference herein.

FIELD

The present disclosure relates to polyethylenes and processes for producing polyethylenes.

BACKGROUND

In many cases, low density polyethylenes (LDPEs) (e.g., LDPE resins) are produced by free radical polymerization using autoclave or tubular reaction processes. Autoclave and tubular reaction processes differ notably in terms of at least reaction residence time distribution, which can affect LDPE properties. In an autoclave process, back mixing of reactant streams is significant while in a tubular process, a plug flow regime of reactant streams is characteristic. In some uses including for example extrusion coating, LDPEs resulting from preparation in an autoclave process are preferred over LDPEs prepared in a tubular process. Nevertheless, the tubular process can be advantageous for providing higher conversion rates, ability to scale-up, and improved economy owing a more efficient utility consumption. Therefore, a need exists to produce, using a tubular process, LDPEs having properties more akin to those of LDPEs produced by an autoclave process.

LDPEs are used in extrusion coatings on various substrates. For this purpose, LDPEs may be used in various combinations and blends with other components such as being combined with Post-Consumer Recycled polyethylene. LDPEs may also be used to form finished parts including, without limitation, films, sheets, lids, bottles, caps, toys, and tubes. In particular, the extrusion coating process involves extruding flowable LDPE, in a molten or liquid state, through a slit-die and casting the flowable LDPE into a film for coating a substrate surface.

Polymers before extrusion are referred to as resins. In general, processability of resins for extrusion coating can be characterized according to a balance between parameters of neck-in and draw-down. Neck-in refers to a ratio of coating width to die width, whereas draw-down indicates ability of casting a resin into a film without tearing. For practical applications, resins also exhibit a critical balance between neck-in, draw-down, and extrusion rate, or line speed. For instance, a first exemplary resin exhibiting a low degree of neck-in, while providing a large coating width, can result in tearing during extrusion even at relatively low line speed (less than about 800 ft/min). In general, the first resin is exemplary of LDPEs formed in an autoclave process. The relatively low line speed (extrusion speed) can limit throughput and usefulness of the first resin in many extrusion coating applications. On the other hand, a second exemplary resin exhibiting a higher degree of neck-in, while being extrudable at higher line speed (greater than about 800 ft/min), can only provide a relatively small coating width. In general, the second resin is exemplary of LDPEs formed in a tubular process. The smaller coating width can limit effectiveness and quality of the second resin in many extrusion coating applications.

What is needed is a process that produces LDPEs exhibiting a degree of neck-in that can provide adequate coating width while also being extrudable at higher line speed (for example, greater than about 800 ft/min).

In summary, there is a need for improved polymerization processes for producing LDPEs in a tubular reactor for high-rate extrusion coating.

References of potential interest include: U.S. Pat. Nos. 7,820,776; 9,238,700; 9,593,177; 9,120,880; WO 2015/166297.

SUMMARY

In some embodiments, a polyethylene has a density of from about 0.91 g/cm$^3$ to about 0.94 g/cm$^3$. The polyethylene has a value of Mz of about 1,500,000 g/mol or greater and a ratio of Mz to Mw of about 7 or greater.

In some embodiments, a low density polyethylene (LDPE) is produced in a tubular reactor comprising first and second reaction zones using a process that includes introducing ethylene monomer and a first free radical initiator to a first one or more inlets of the first reaction zone. The first reaction zone has a first inlet temperature for the one or more inlets of the first reaction zone. In particular embodiments, the first free radical initiator and ethylene monomer may be introduced via the same inlet to the first reaction zone. The process may also include introducing additional ethylene monomer and a second free radical initiator to a second one or more inlets of the second reaction zone. The second reaction zone has a second inlet temperature for the one or more inlets of the second reaction zone that is the same or different than the first inlet temperature. In particular embodiments, the second free radical initiator and additional ethylene monomer may be introduced via the same inlet to the second reaction zone. In some embodiments, each of the first and second inlet temperatures are below about 150° C., each of the first and second reaction zones has a pressure below about 3100 barg, and/or the first free radical initiator is the same or different than the second free radical initiator.

In some embodiments, a process for extrusion coating a polyethylene onto a substrate includes providing a coating line including an extrusion die. The process includes heating the extrusion die and the polyethylene at a first temperature at or above a melt temperature of the polyethylene. The polyethylene has a density of from about 0.91 g/cm$^3$ to about 0.94 g/cm$^3$, a value of Mz of about 1,500,000 g/mol or greater, and a ratio of Mz to Mw of about 7 or greater The process further includes operating the coating line at a first line speed of about 500 ft/min or greater. The process further includes extruding the polyethylene through the extrusion die. The process further includes casting the extruded polyethylene onto the substrate without tearing.

BRIEF DESCRIPTION OF THE DRAWINGS

So that the manner in which the above recited features of the present disclosure can be understood in detail, a more particular description of the disclosure, briefly summarized above, may be had by reference to embodiments. Certain aspects of some embodiments are illustrated in the appended figures. It is to be noted, however, that the appended figures illustrate only exemplary embodiments, and therefore are not to be considered limiting of scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to processes for producing LDPEs using a tubular reactor. In at least one embodiment, processes and apparatus of the present disclosure include at least two reaction zones. The present disclosure relates to processes for producing LDPEs using low inlet pressure and/or low inlet temperature, thus providing LDPEs having increased molecular weight distribution (MWD), increased Mz values, increased Mz/Mw ratios, and/or an increased degree of long chain branching (LCB), as compared to conventional LDPEs, that can be extruded at a high-speed. An LDPE can have a density of from about 0.91 g/cm$^3$ to about 0.94 g/cm$^3$, such as from about 0.915 g/cm$^3$ to about 0.935 g/cm$^3$, according to ASTM D1505.

The following abbreviations may be used herein: LDPE is low density polyethylene, LCB is long chain branching, Mz is size average molecular weight, Mw is weight average molecular weight, Mn is number average molecular weight, MI is melt index, ZSV is zero shear viscosity, MS is melt strength, GPC is gel permeation chromatography, LS is light scattering, NI is neck-in, DD is draw-down, MWD is molecular weight distribution, barg is pressure in bars relative to atmospheric pressure, ppmw is parts per million weight.

A "polyethylene" (such as an LDPE) of the present disclosure is a polymer or copolymer comprising at least 50 mole % ethylene derived units (units formed by ethylene polymerization), such as at least 75 mole % ethylene derived units, such as at least 90 mole % ethylene derived units, such as at least 95 mole % ethylene derived units, such as at least 99 mole % ethylene derived units, wherein the remainder balance of the polyethylene includes one or more comonomer units. Polyethylene copolymers can have comonomers such as a $C_2$-$C_{30}$ α-olefin or $C_2$-$C_{30}$ diene (such as a $C_2$-$C_{30}$ α,ω-diene or vinyl norbornene). For example, a $C_2$-$C_{30}$ α-olefin may be propylene. Comonomers can be provided to a tubular reactor of the present disclosure at the same or different inlets as ethylene monomers.

In some embodiments, a polyethylene is substantially ethylene derived units (e.g., 100 mole % ethylene derived units).

The term "continuous" means a system that operates without interruption or cessation. For example a continuous process to produce a polymer would be one where the reactants are continually introduced into one or more reactors and polymer product is continually withdrawn.

Tubular Reactor

Figure 1A:
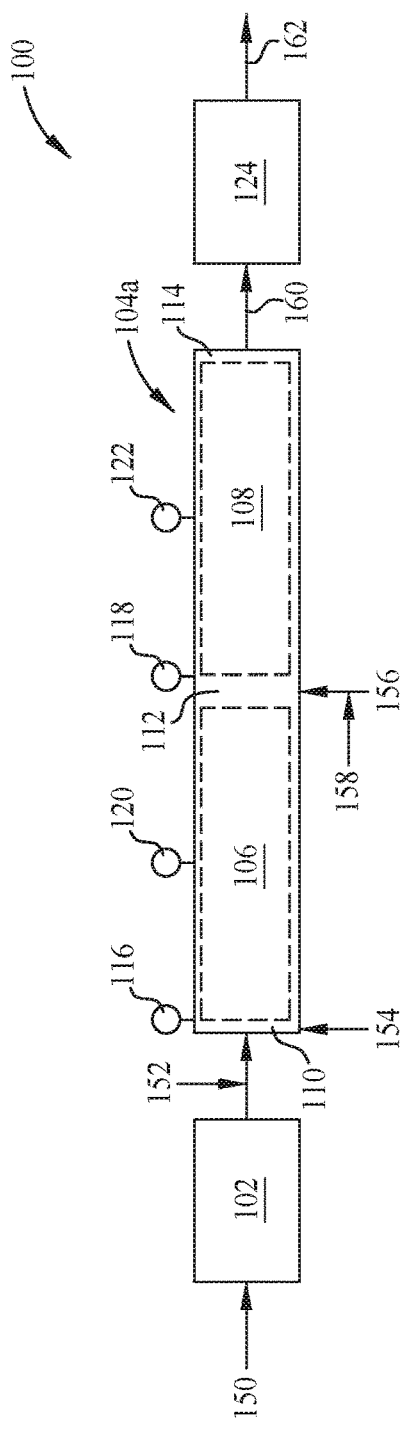
FIG. 1A is a diagram illustrating an apparatus for forming LDPEs, according to an embodiment.

FIG. 1A is a diagram illustrating an example apparatus 100 for forming LDPEs, according to an embodiment. Referring to FIG. 1A, the apparatus 100 includes a compressor 102 and a tubular reactor 104a in series with each other, the tubular reactor 104a being located downstream of the compressor 102. In some embodiments, the reactor 104a may be integrally formed such as by welding. In some embodiments, a total tubular length of the reactor 104a may be from about 1000 meters (m) to about 2000 m with an internal tubular diameter of from about 25 millimeters (mm) to about 50 mm. The reactor 104a includes a first reaction zone 106 and a second reaction zone 108 in series with each other, the second reaction zone 108 being located downstream of the first reaction zone 106. In at least one embodiment, the reactor 104a may include from two to six reaction zones, such as two reaction zones, three reaction zones, four reaction zones, five reaction zones, or six reaction zones. The first reaction zone 106 has a first inlet 110 located at an upstream portion thereof. The first inlet 110 may refer to a port formed through a wall of the reactor 104a or may refer more generally to an inlet zone or mixing zone of the reactor 104a (e.g., such that multiple inlets along the reactor feed the inlet zone or mixing zone, as may be the case where monomer and initiator are fed via separate inlets, but into the same inlet zone). In any case, the first inlet 110 is coincident with an upstream portion of the reactor 104a for introducing a first influent stream to the first reaction zone 106 (or, alternatively (not shown in FIG. 1), for introducing one or more influent streams into the same inlet zone, e.g., where monomer and initiator are fed separately but into the same inlet zone). Likewise, the second reaction zone 108 has a second inlet 112 located at an upstream portion thereof. Like the first inlet 110, the second inlet 112 may also refer to a port formed through a wall of the reactor 104a or may refer more generally to an inlet zone or mixing zone of the reactor 104a, with the same allowance in particular embodiments as with the first reaction zone for embodiments in which additional ethylene monomer and/or second initiator are fed via separate influent streams and/or inlets into the same inlet zone). In at least one embodiment, the reactor 104a may include at least one inlet at an upstream end of each reaction zone, such as from two to six inlets, such as two inlets, three inlets, four inlets, five inlets, or six inlets. As shown in FIG. 1A, the second inlet 112 is located near a midstream point of the reactor 104a for introducing a second influent stream to the second reaction zone 108. Despite being identified separately, the first and second reaction zones 106, 108 are continuous with each other. For purposes of explanation, the location of the second inlet 112 used to delineate the two zones 106, 108 is determined according to a location of a feed stream introducing additional monomer and/or initiator to the second reaction zone 108. The reactor 104a also includes an outlet 114 located at a downstream portion of the second reaction zone 108 for receiving an effluent stream from the second reaction zone 108, the outlet 114 being coincident with a downstream portion of the reactor 104a.

In addition, the reactor 104*a* includes various sensors for measuring and transmitting various physical conditions from inside the reactor 104*a*. For instance, the reactor 104*a* includes a first temperature probe 116 located at the first inlet 110 and a second temperature probe 118 located at the second inlet 112. The reactor 104*a* also includes a first pressure probe 120 located near a middle of the first reaction zone 106 and a second pressure probe 122 located near a middle of the second reaction zone 108. Alternatively, in some other reactors, the first pressure probe 120 may be located at the first inlet 110, and the second pressure probe 122 may be located at the second inlet 112, such as at a mixing point of the second inlet 112. Alternatively, a single pressure probe may be located near the middle of the reactor 104*a*. In some embodiments, addition to or rearrangement of the temperature and pressure probes 116, 118, 120, 122 may be advantageous for control and/or monitoring of the reaction, and such modifications are within the scope of the present disclosure. In some embodiments, the reactor 104*a* may be externally cooled by a cooling jacket. In other embodiments, the reactor 104*a* may be externally heated by electrical or gas heating elements.

The apparatus 100 also includes various devices 124 located downstream of the reactor 104*a* for receiving the effluent stream from the outlet 114. The downstream devices 124 may include valves, coolers, separators, extruders, granulators, recycle streams, etc.

Figure 1B:
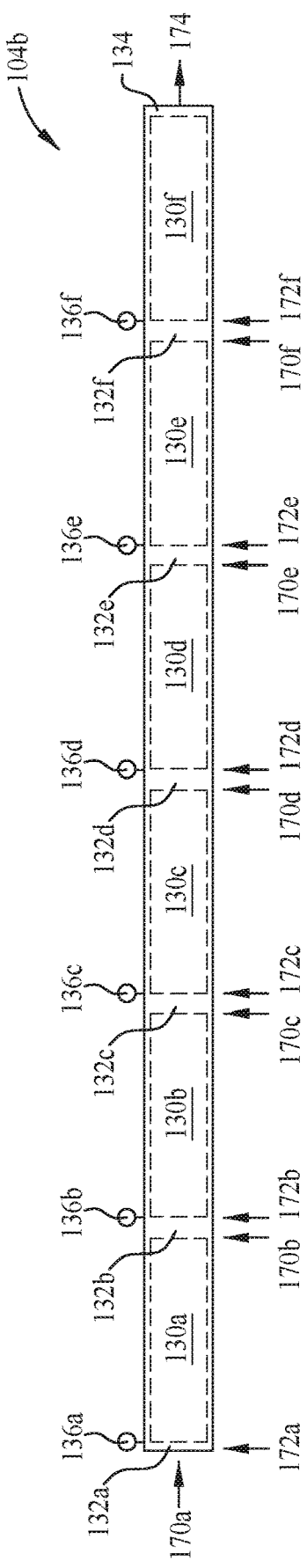
FIG. 1B is a diagram illustrating another reactor of FIG. 1A, according to an embodiment.

FIG. 1B is a diagram illustrating a reactor 104*b*, according to an embodiment. The reactor 104*b* includes a first reaction zone 130*a*, a second reaction zone 130*b*, a third reaction zone 130*c*, a fourth reaction zone 130*d*, a fifth reaction zone 130*e*, and a sixth reaction zone 130*f* in series with each other. The second reaction zone 130*b* is located downstream of the first reaction zone 130*a*. Third reaction zone 130*c* is located downstream of reaction zones 130*a* and 130*b*. Fourth reaction zone 130*d* is located downstream of reaction zones 130*a*, 130*b*, and 130*c*. Fifth reaction zone 130*e* is located downstream of reaction zones 130*a*, 130*b*, 130*c*, and 130*d*. Sixth reaction zone 130*f* is located downstream of reaction zones 130*a*, 130*b*, 130*c*, 130*d*, and 130*e*.

The first reaction zone 130*a* has a first inlet 132*a* located at an upstream portion thereof. The first inlet 132*a* may refer to a port formed through a wall of the reactor 104*b* or may refer more generally to an inlet zone or mixing zone of the reactor 104*b*. In any case, the first inlet 132*a* is coincident with an upstream portion of the reactor 104*b* for introducing a first influent stream to the first reaction zone 130*a*. Likewise, each subsequent reaction zone 130*b*-130*f* has a respective inlet 132*b*-132*f* located at an upstream portion thereof. Like the first inlet 132*a*, each subsequent inlet 132*b*-132*f* may also refer to a port formed through a wall of the reactor 104*b* or may refer more generally to an inlet zone or mixing zone of the reactor 104*b*. In at least one embodiment, the reactor 104*b* may include at least one inlet at an upstream end of each reaction zone, such as from two to six inlets, such as two inlets, three inlets, four inlets, five inlets, or six inlets. Despite being identified separately, the reaction zones 130*a*, 130*b*, 130*c*, 130*d*, 130*e*, and 130*f* are continuous with each other. For purposes of explanation, the locations of the inlets 132*b*-132*f* used to delineate the reaction zones 130*a*-130*f* are determined according to a location of each feed stream introducing additional monomer and/or initiator to each reaction zone 130*b*-130*f*. The reactor 104*b* also includes an outlet 134 located at a downstream portion of the sixth reaction zone 130*f* for receiving an effluent stream from the sixth reaction zone 130*f*, the outlet 134 being coincident with a downstream portion of the reactor 104*b*.

In addition, the reactor 104*b* includes various sensors for measuring and transmitting various physical conditions from inside the reactor 104*b*. For instance, the reactor 104*b* includes sensors 136*a*, 136*b*, 136*c*, 136*d*, 136*e*, and 136*f* located at respective inlets 132*a*-132*f*, such as at mixing points thereof. In some embodiments, the sensors 136*a*-136*f* may be independently temperature and/or pressure probes. In some embodiments, addition to, subtraction from, or rearrangement of the sensors 136*a*-136*f* may be advantageous for control and/or monitoring of the reaction, and such modifications are within the scope of the present disclosure. In some embodiments, the reactor 104*b* may be externally cooled by a cooling jacket. In other embodiments, the reactor 104*b* may be externally heated by electrical and/or gas heating elements.

Polymerization Process and Conditions

As introduced above, LDPEs are generally produced using autoclave or tubular reaction processes. Compared to LDPEs produced in a tubular process, LDPEs produced in an autoclave process oftentimes have broader molecular weight distribution (MWD) and higher Mz values at given melt index and density.

Polymerizations of the present disclosure can produce, using a tubular process, LDPEs having properties more akin to those of LDPEs produced by an autoclave process. However, modifying a tubular process for this purpose presents numerous challenges. In general, operating a tubular reaction process at too low temperature and/or pressure can result in fouling due to deposition of reaction products inside the reactor. In other words, reaction products dissolved in a gas flow at suitable temperature and pressure can precipitate when either temperature or pressure drops below a minimum threshold value. For this reason, reduction in temperature and/or pressure of LDPE tubular reaction processes is conventionally avoided.

Nonetheless, the present disclosure provides a method for operating a tubular reactor at reduced inlet temperature and/or reduced pressure to obtain LDPEs having broader MWD and higher Mz values. In addition, the LDPEs produced by the present methods also have increased values of Mz/Mw and a higher degree of long chain branching (LCB) at given melt index and density, as compared to existing tubular and autoclave processes. Thus the present methods improve upon existing LDPE polymerization reaction processes of both types.

Figure 2:
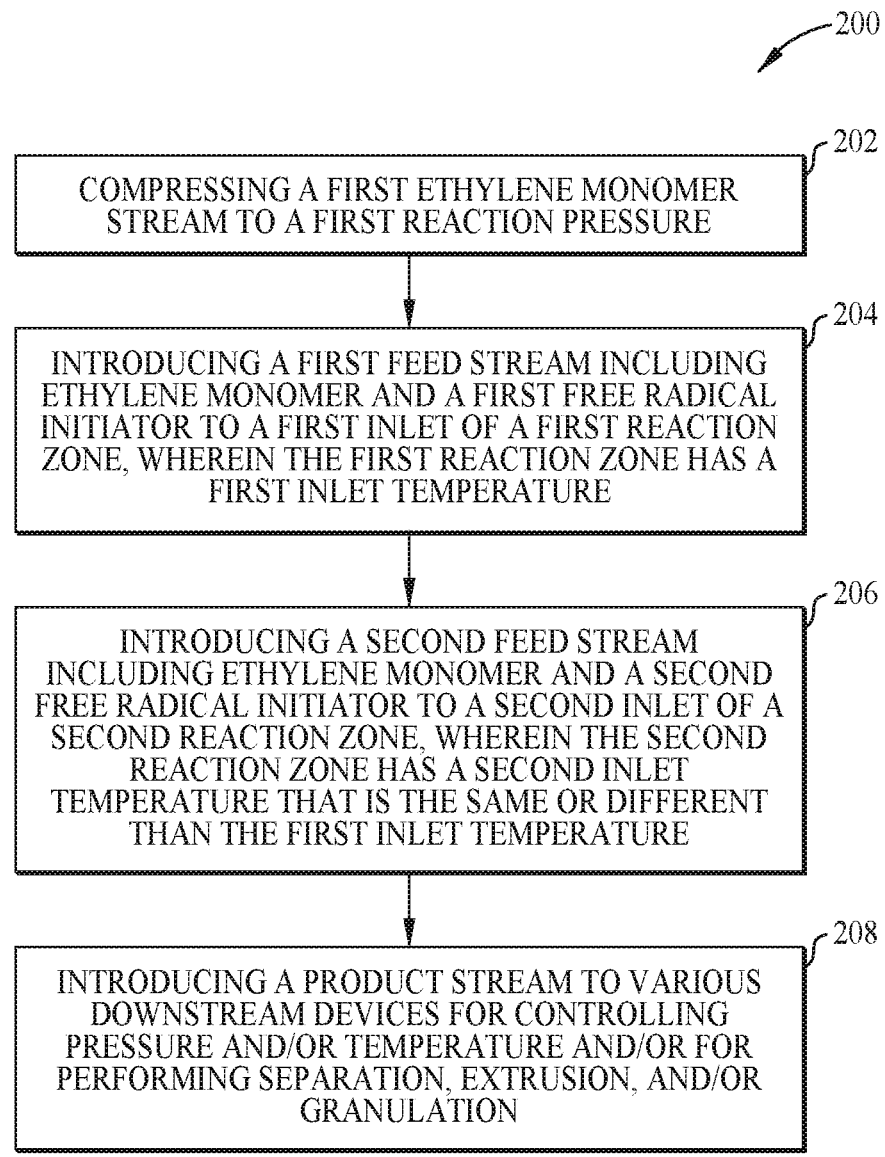
FIG. 2 is a flow chart illustrating a polymerization method for forming LDPEs using the apparatus of FIG. 1A, according to an embodiment.

FIG. 2 is a flow chart illustrating a polymerization method 200 for forming LDPEs using the apparatus 100 of FIG. 1A, according to an embodiment. Referring to FIG. 1A and FIG. 2 collectively, the method 200 begins, at block 202, by compressing a first ethylene monomer stream 150 (front feed) to a first reaction pressure using the compressor 102. In practice, the first ethylene monomer stream 150, in a gas phase, is introduced to an upstream, or low pressure end, of the compressor 102. In some embodiments, a flow rate of the first ethylene monomer stream 150 may be from about 5 kg/s to about 15 kg/s, such as about 10 kg/s. In some embodiments, the compressor increases a pressure of the first ethylene monomer stream 150 to a first reaction pressure of about 1500 barg to about 3100 barg, such as from about 1500 barg to about 2000 barg. The first ethylene monomer stream 150 is passed through a tubular pre-heater to increase a temperature of the first ethylene monomer stream 150 to a first reaction temperature of about 120° C. to about 150° C., such as from about 125° C. to about 130° C.

At block 204, the method 200 proceeds by introducing a gas phase first influent stream, or feed stream, to the first reaction zone 106 via the first inlet 110. The first influent stream includes the compressed first ethylene monomer stream 150, a first modifier stream 152, and a first free radical initiator stream 154. The first modifier stream 152 may be added to the first ethylene monomer stream 150 upstream of the compressor 102. Alternatively, the first modifier stream 152 may be added downstream of the compressor 102. An injection rate of the first modifier stream 152 may be from about 0.75 g/s to about 9.0 g/s, such as from about 0.75 g/s to about 3.0 g/s, alternatively from about 2.25 g/s to about 9.0 g/s, depending on a flow rate of the first influent stream and a concentration of the modifier. A temperature of the first modifier stream 152 may be from about atmospheric temperature to about 50° C., such as from about 20° C. to about 25° C. A pressure of the first modifier stream 152 may be from about atmospheric pressure to about 100 barg, such as from about 0 barg to about 20 barg. In some embodiments, the first modifier stream 152 may include a free radical chain transfer agent. Free radical chain transfer agents may include propionaldehyde, aromatic hydrocarbons, thiols, disulfides, halogen compounds (such as chloroform, carbon tetrachloride, and carbon tetrabromide), or combination(s) thereof. In some embodiments, a concentration of the chain transfer agent (such as propionaldehyde) in the first influent stream is from about 150 ppmw to about 600 ppmw, such as from about 150 ppmw to about 300 ppmw, alternatively from about 300 ppmw to about 450 ppmw, alternatively from about 450 ppmw to about 600 ppmw. In some embodiments, the chain transfer agent may modify a melt index and/or a density of an LDPE that is produced.

The first free radical initiator stream 154 may be directly and separately introduced to the first reaction zone 106 via the first inlet 110. In such embodiments, the first free radical initiator stream 154 may be introduced to the reactor 104a through a different port from that of the combined first ethylene monomer and first modifier streams 150, 152. Alternatively, the first free radical initiator stream 154 may be pre-mixed with the combined first ethylene monomer and first modifier streams 150, 152 upstream of the first inlet 110. An injection rate of the first free radical initiator stream 154 may be from about 0.1 g/s to about 7.5 g/s, such as from about 0.1 g/s to about 0.3 g/s, alternatively from about 0.5 g/s to about 1.5 g/s, alternatively from about 1.0 g/s to about 3.0 g/s, alternatively from about 2.5 g/s to about 7.5 g/s, depending on a flow rate of the first influent stream and a type of free radical initiator used. A temperature of the first free radical initiator stream 154 may be from about atmospheric temperature to about 50° C., such as from about 20° C. to about 25° C. A pressure of the first free radical initiator stream 154 may be from about atmospheric pressure to about 100 barg, such as from about 0 barg to about 20 barg. Free radical initiators may include oxygen, organic peroxides, certain azo compounds, and combinations thereof. In some embodiments, the first free radical initiator stream 154 may include oxygen. In some embodiments, a first concentration of oxygen in the first influent stream is from about 20 ppmw to about 100 ppmw, such as from about 20 ppmw to about 50 ppmw, alternatively from about 40 ppmw to about 70 ppmw, alternatively from about 70 ppmw to about 100 ppmw. In some embodiments, the first free radical initiator stream 154 may include an organic peroxide. In some embodiments, a first concentration of organic peroxide in the first influent stream is from about 200 ppmw to about 500 ppmw, such as from about 200 ppmw to about 300 ppmw, alternatively from about 300 ppmw to about 400 ppmw, alternatively form about 400 ppmw to about 500 ppmw.

In the first reaction zone 106, a free radical initiated polymerization occurs to form a first intermediate stream. According to the method 200, a first inlet temperature of the first reaction zone 106 can be determined and controlled using the first temperature probe 116 located at the first inlet 110. The first reaction zone 106 has a first inlet temperature below about 150° C., such as from about 120° C. to about 140° C., such as from about 125° C. to about 130° C., such as about 130° C., alternatively from about 130° C. to about 140° C., such as about 135° C. A difference in temperature ("delta T") between the first inlet temperature of the first reaction zone 106 and a peak temperature of the first reaction zone may be from about 40° C. to about 70° C., such as from about 50° C. to about 60° C. Likewise, a delta T between an inlet temperature of each subsequent reaction zone (e.g., zone 2, zone 3, zone 4, zone 5, and/or zone 6) and a respective peak temperature of a subsequent reaction zone may be from about 40° C. to about 70° C., such as from about 50° C. to about 60° C. Increasing temperature across each reaction zone promotes conversion rate and broadens MWD. In some embodiments, a minimum temperature may be dictated by a type of initiator used. In some embodiments, a minimum temperature may correspond to a temperature at which an initiator has a half-life of about 1 s. In some embodiments, a peak temperature of the first reaction zone 106 may be set to from about 300° C. to about 400° C., such as from about 320° C. to about 360° C., such as about 340° C., alternatively from about 260° C. to about 345° C., such as about 300° C. In some embodiments, the polymerization reaction is an exothermic reaction, and the reactor 104a is externally cooled by a cooling jacket in order to maintain reactor temperature below a peak temperature. Also according to the method 200, a first pressure of the first reaction zone 106 can be determined and controlled using the first pressure probe 120 located near a middle of the first reaction zone 106. For example, the first pressure of the first reaction zone 106 can be below about 3100 barg, such as from about 1000 barg to about 2500 barg, such as from about 1500 barg to about 2300 barg, such as from about 1500 barg to about 2000 barg, such as about 2000 barg, alternatively from about 1800 barg to about 2500 barg, such as from about 2000 barg to about 2500 barg, such as about 2300 barg. In at least one embodiment, a pressure drop across the first reaction zone 106 may be from about 100 barg to about 500 barg, such as about 300 barg. In at least one embodiment, the first pressure probe 120 may be located at the first inlet 110. In at least one embodiment, a first inlet pressure at the first inlet 110 may be below about 3100 barg, such as from about 1000 barg to about 3100 barg, such as from about 1800 barg to about 2500 barg, such as from about 2000 barg to about 2500 barg, such as about 2300 barg.

At block 206, the method 200 proceeds by introducing a second influent stream to the second reaction zone 108 via the second inlet 112. The second influent stream includes the first intermediate stream, a second ethylene monomer stream 156 (side stream), and a second free radical initiator stream 158. A second composition and/or second concentration of each component in the second influent stream may be the same or different from the first composition and/or first concentration of each component in the first influent stream described above. The first and second free radical initiator streams 154, 158 are provided to begin polymerization and to drive initial polymerization at lower temperatures (from about 130° C. to about 200° C.). In at least one embodiment, a majority of free radicals for polymerization are generated from dissociation of oxygen (02) from process air at higher temperatures, such as temperatures of about 200° C. or higher, which are able to thermally dissociate the oxygen and continue the reaction to a targeted temperature of about 340° C. In some embodiments, a second modifier stream may be introduced to the second reaction zone 108. In some embodiments, a mass feed ratio (slip ratio) of the first ethylene monomer stream 150 to the second ethylene monomer stream 156 is from about 1.1 to about 1.5, such as about 1.3. In at least one embodiment, the method 200 may include introducing at least one influent stream per inlet, such as from two to six influent streams. Each influent stream may include an additional ethylene monomer stream and/or an additional free radical initiator stream. A composition and/or concentration of each component in the additional influent streams may be the same or different from the first composition and/or first concentration of each component in the first influent stream described above.

In the second reaction zone 108, a further free radical initiated polymerization occurs to form an effluent stream (product stream 160) that exits the reactor 104a through the outlet 114. According to the method 200, a second inlet temperature of the second reaction zone 108 can be determined and controlled using the second temperature probe 118 located at the second inlet 112. In particular, the second reaction zone 108 has a second inlet temperature below about 190° C., such as below about 150° C., such as from about 125° C. to about 140° C., such as from about 130° C. to about 135° C., such as about 135° C., alternatively from about 130° C. to about 140° C., such as about 135° C. In some embodiments, the second inlet temperature may be greater than the first inlet temperature. In some embodiments, a peak temperature of the second reaction zone 108 may be set to from about 300° C. to about 400° C., such as from about 320° C. to about 360° C., such as about 340° C. Also according to the method 200, a second pressure of the second reaction zone 108 can be determined and controlled using the second pressure probe 122 located near a middle of the second reaction zone 108. For example, the second pressure is below about 3100 barg, such as from about 1000 barg to about 2500 barg, such as from about 1500 barg to about 2000 barg, such as about 2000 barg, alternatively about 1700 barg. In at least one embodiment, a pressure drop across the second reaction zone 108 may be from about 100 barg to about 500 barg, such as about 300 barg. In at least one embodiment, the second pressure probe 122 may be located at the second inlet 112, such as at a mixing point of the second inlet 112. In at least one embodiment, a second inlet pressure at the second inlet 112 may be below about 3100 barg, such as from about 1000 barg to about 2500 barg, such as from about 1500 barg to about 2300 barg, such as from about 1500 barg to about 2000 barg, such as about 2000 barg. Although not bound by theory, maintaining the first and second inlet temperatures below about 150° C. likely maintains organic peroxide free radical initiator activity for a longer time within each of the first and second reaction zones 106, 108. This improved initiator activity is a likely contributor to LDPEs being produced by the method 200 having increased values of Mz/Mw, increased MWD, increased values of Mz, and/or a higher degree of LCB.

At block 208, the method 200 proceeds by introducing the product stream 160 to various downstream devices 124 for controlling pressure and/or temperature and/or for performing separation, extrusion, and/or granulation. In some embodiments, the product stream 160 may undergo a separation process to form a recycle stream 162 containing unreacted ethylene monomer. In such embodiments, the recycle stream 162 may be combined with either of the first or second ethylene monomer streams 150, 156 for reintroduction into the reactor 104a.

Referring to FIG. 1B and FIG. 2 collectively, the method 200 may also be implemented using the reactor 104b. A modified version of the method 200 is described below; however, detailed description of the method 200 may be incorporated without limitation. At block 204, a first ethylene monomer stream 170a and a first free radical initiator stream 172a are introduced to the first reaction zone 130a via the first inlet 132a. The first ethylene monomer stream 170a may include a first modifier stream. Detailed description of the reaction conditions and polymerization process from the first reaction zone 106 may be applied to the first reaction zone 130a without limitation. At block 206, a second influent stream is introduced to the second reaction zone 130b via the second inlet 132b. The second influent stream includes a first intermediate stream, a second ethylene monomer stream 170b (first side stream), and a second free radical initiator stream 172b. A second composition and/or second concentration of each component in the second influent stream may be the same or different from the first composition and/or first concentration of each component in the first influent stream described above. In some embodiments, a second modifier stream may be introduced to the second reaction zone 130b. Subsequently, third, fourth, fifth, and sixth influent streams are introduced to the third, fourth, fifth, and sixth reaction zones 130c-130f, respectively, via the third, fourth, fifth, and sixth inlets 132c-132f, respectively. The third, fourth, fifth, and sixth influent streams include second, third, fourth, and fifth intermediate streams, respectively; third, fourth, fifth, and sixth ethylene monomer stream 170c, 170d, 170e, and 170f (second through fifth side streams), respectively; and third, fourth, fifth, and sixth free radical initiator stream 172c, 172d, 172e, and 172f, respectively. A composition and/or concentration of each component in the additional influent streams may be independently the same or different from the first composition and/or first concentration of each component in the first influent stream described above. Detailed description of the reaction conditions and polymerization process from the second reaction zone 108 may be independently applied to the second through sixth reaction zones 130b-130f without limitation. In the sixth reaction zone 130f, a further free radical initiated polymerization occurs to form an effluent stream (product stream 174) that exits the reactor 104b through the outlet 134.

Polymer Products

For purposes herein, ASTM refers to the American Society for Testing and Materials; it is to be understood that when an ASTM method is referred to for use in characterizing a property of a sample, the ASTM method referred to is the current revision of the ASTM method in force at the time of filing of this application, unless otherwise indicated.

Polymer products resulting from polymerizations of the present disclosure can be characterized to determine at least melt index, density, Mn, Mw, Mz, Mw/Mn, Mz/Mw, LCB index, zero shear viscosity (ZSV), and melt strength (MS). Melt index ($I_2$) values can be determined by extrusion testing at elevated temperature according to ASTM D1238 procedure B (190° C., 2.16 kg), such as by using a Gottfert MI-2 series melt flow indexer. Density values can be determined by displacement according to ASTM D1505.

Molecular weight data (Mz, Mn, Mw) should be determined according to absolute GPC method as determined by light scattering. In particular, absolute molecular weight values are obtained by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 μm Mixed-B LS columns are used to provide polymer separation. Detailed analytical principles and methods are described in WO2019246069A1, of which the section of GPC 4D methodology (paragraphs [0044]-[0059] are herein incorporated by reference, which paragraphs describe determining molecular weight data by the absolute method. The parameters needed could be found in the referenced WO2019246069 document, and are also included in the following for clarification: the refractive index, n=1.500 for TCB at 145° C., 1=665 nm; dn/dc=0.1048 ml/mg and A2=0.0015. Form factor P is described in Sun, T. et al. Macromolecules 2001, 34, 6812.

Rheology data can be determined using a TA Instrument model ARES-G2B via small amplitude oscillatory shear (SAOS) testing at 170° C. Testing specimens were compression molded using a press. The testing specimens had a diameter of 25 mm and a thickness of about 1.5 mm. The specimens were preheated to 170° C., and testing temperature was equilibrated at 170° C. for 5 min prior to testing. Testing frequency was from 0.01 to 638 rad/s, and oscillation strain was about 10% during the test. Zero Shear Viscosity (η) can be obtained by using a Cross model based on the SAOS data per the following formula, where $\eta_0$ is the Newtonian viscosity; $\eta_\infty$ is the infinite viscosity; k is the consistency; γ is the shear rate used; and n is the power law index +1:

$$\frac{\eta - \eta_\infty}{\eta_0 - \eta_\infty} = \frac{1}{1 + (k\gamma)^n}$$

Melt strength can be obtained using a CEAST SmartRheo instrument having piston diameter of 15 mm, die length of 30 mm, and die diameter of 2 mm. Test conditions included temperature of 170° C., piston speed of 0.212 mm/s, and acceleration of 2.4 $mm/s^2$.

The present disclosure relates to compositions of matter produced by the methods described herein. In at least one embodiment, a polyethylene has a melt index ($I_2$) of about 3.0 g/10 min or greater, such as from about 3.0 g/10 min to about 15 g/10 min, such as from about 3.0 g/10 min to about 6.0 g/10 min, such as from about 4.0 g/10 min to about 5.0 g/10 min, alternatively from about 6.0 g/10 min to about 9.0 g/10 min, such as from about 7.0 g/10 min to about 8.0 g/10 min, alternatively from about 9.0 g/10 min to about 15.0 g/10 min, such as from about 11.0 g/10 min to about 12.0 g/10 min, when determined according to ASTM D1238 procedure B (190° C., 2.16 kg).

In at least one embodiment, a polyethylene has a density of about 0.91 $g/cm^3$ to about 0.94 $g/cm^3$, such as from about 0.915 $g/cm^3$ to about 0.935 $g/cm^3$, such as from about 0.915 $g/cm^3$ to about 0.925 $g/cm^3$, such as from about 0.919 $g/cm^3$ to about 0.921 $g/cm^3$, such as from about 0.919 $g/cm^3$ to about 0.92 $g/cm^3$, such as from about 0.9196 $g/cm^3$ to about 0.9198 $g/cm^3$, alternatively from about 0.92 $g/cm^3$ to about 0.921 $g/cm^3$, such as from about 0.92 $g/cm^3$ to about 0.9206 $g/cm^3$, such as from about 0.92 $g/cm^3$ to about 0.9202 $g/cm^3$, alternatively from about 0.9204 $g/cm^3$ to about 0.9206 $g/cm^3$, when determined according to ASTM D1505.

In at least one embodiment, a polyethylene has an Mn value of about 12,000 g/mol to about 17,000 g/mol, such as from about 13,000 g/mol to about 14,000 g/mol, alternatively from about 14,000 g/mol to about 15,000 g/mol, alternatively from about 15,000 g/mol to about 16,000 g/mol.

In at least one embodiment, a polyethylene has an Mw value of about 140,000 g/mol to about 230,000 g/mol, such as from about 150,000 g/mol to about 160,000 g/mol, alternatively from about 170,000 g/mol to about 180,000 g/mol, alternatively from about 205,000 g/mol to about 215,000 g/mol.

In at least one embodiment, a polyethylene has an Mz value of about 1,500,000 g/mol or greater, such as from about 1,500,000 g/mol to about 3,000,000 g/mol, such as from about 2,000,000 g/mol to about 3,000,000 g/mol, such as from about 2,225,000 to about 2,325,000 g/mol, alternatively from about 2,380,000 g/mol to about 2,480,000 g/mol, alternatively from about 2,665,000 g/mol to about 2,765,000 g/mol.

In at least one embodiment, a polyethylene has a value of Mw/Mn of about 9.0 to 16.0, such as from about 9.0 to about 15.0, such as from about 11.0 to about 13.0, such as from about 11.5 to about 12.0, alternatively from about 13.0 to about 15.0, such as from about 13.5 to about 14.0.

In at least one embodiment, a polyethylene has a value of Mz/Mw of about 6.0 or greater, such as from about 6.0 to about 20.0, such as from about 10.0 to about 18.0, alternatively from about 8.5 to about 12.5, such as from about 10.3 to about 11.3 such as from about 10.7 to about 10.9, alternatively from about 12.5 to about 15.5, such as from about 13.4 to about 14.4, such as from about 13.8 to about 14.0, alternatively from about 15.5 to about 18.5, such as from about 16.6 to about 17.6, such as from about 17.0 to about 17.2.

In at least one embodiment, a polyethylene has an LCB index of about 0.27 or greater, such as from about 0.27 to about 0.50, such as from about 0.35 to about 0.45, such as from about 0.37 to about 0.39, alternatively from about 0.40 to about 0.42, alternatively from about 0.41 to about 0.43.

In at least one embodiment, a polyethylene has a ZSV of about 14,000 Pa*s or less, such as from about 1,000 Pa*s to about 14,000 Pa*s, such as from about 1,000 Pa*s to about 4,000 Pa*s, such as from about 2,000 Pa*s to about 3,000 Pa*s, alternatively from about 3,000 Pa*s to about 6,000 Pa*s, such as from about 4,000 Pa*s to about 5,000 Pa*s, alternatively from about 8,000 Pa*s to about 11.00 Pa*s 0, such as from about 9,000 Pa*s to about 10,000 Pa*s.

In at least one embodiment, a polyethylene has a melt strength of about 14.0 cN or less, such as from about 3.0 cN to 14.0 cN, such as from about 4.0 cN to about 6.0 cN, such as from about 5.0 cN to about 5.5 cN, alternatively from about 6.0 cN to about 9.0 cN, such as from about 6.7 cN to about 7.3 cN, alternatively from about 9.0 cN to about 14.0 cN, such as from about 11.0 cN to about 12.0 cN, such as from about 11.2 cN to about 11.8 cN, when measured at 170° C.

Extrusion Coating Lines

Extrusion coating is a fabrication process in which molten polymer is extruded and applied onto a support or substrate. In some embodiments, extruded coatings can be coated onto a non-plastic substrate, such as paper or aluminum in order to obtain a multi-material structure. This structure typically combines toughness, sealing and resistance properties of the polymer formulation with barrier, stiffness or aesthetic attributes of the non-polymer substrate. In some other embodiments, extruded coatings can be coated onto a plastic substrate, such as a biaxially oriented polypropylene film. In the foregoing processes, the substrate is typically fed from a roll into a molten polymer as the polymer is extruded from a slot die, which is similar to a cast film process. The resultant structure is cooled, typically with a chill roll or rolls, and formed into finished rolls. Extrusion coating materials can be used in, for example, food and non-food packaging, pharmaceutical packaging, and manufacturing of goods for the construction (insulation elements) and photographic industries (paper).

Figure 3A:
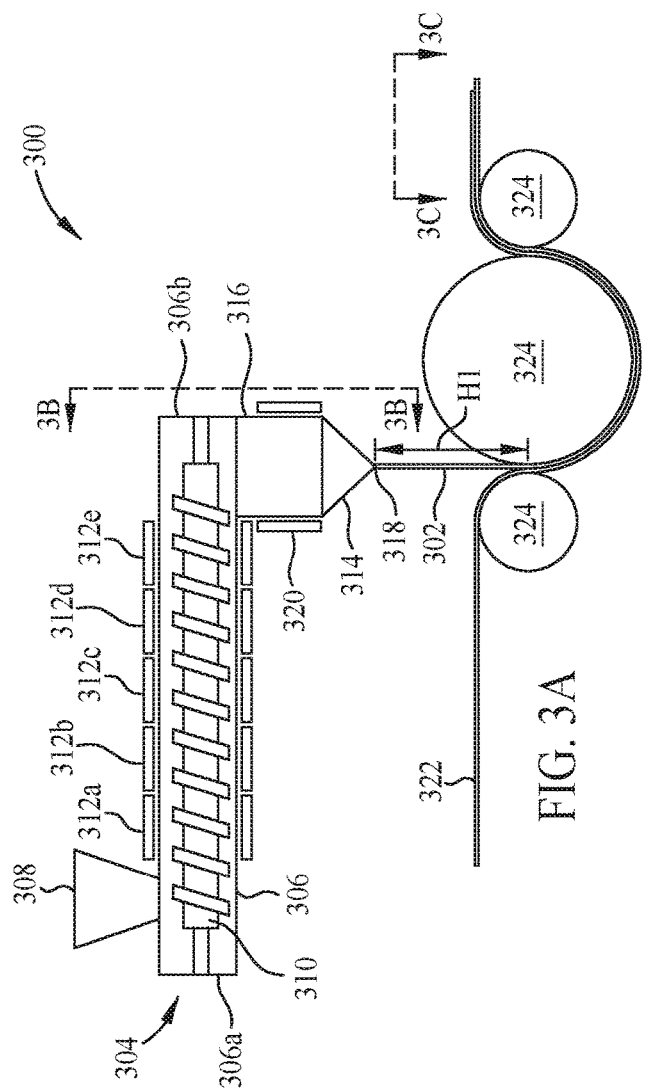
FIG. 3A is a diagram illustrating an extrusion coating apparatus, according to an embodiment.

FIG. 3A is a diagram illustrating an extrusion coating apparatus 300 for extrusion coating of a resin 302, according to an embodiment. Referring to FIG. 3A, the extrusion coating apparatus 300 includes an extruder 304 having a barrel 306. The barrel 306 has a first upstream end 306a and a second downstream end 306b. A feeder 308 is attached to a top part of the barrel 306 near the first end 306a for feeding the resin 302 to the barrel 306. A screw 310 is disposed inside the barrel 306 for moving the resin 302 along the barrel 306 from the first end 306a to the second end 306b. In some embodiments, the screw 310 may have a diameter of about 2.5 inches and an L/D ratio of about 34. One or more heating elements 312a-312e are disposed around an outside of the barrel 306. In practice, the resin 302 is introduced to the first end 306a of the barrel 306 through the feeder 308. Inside the barrel 306, the resin 302 is gradually heated to an extrusion temperature, which may be a melt temperature of the resin 302. The heating process can involve increasing a temperature as the resin 302 moves through successive zones of the barrel 306, each zone being heated by a respective heating element 312a-312e. In some embodiments, the heating elements 312a-312e heat the respective zones to temperatures of about 390° F., about 490° F., about 585° F., about 595° F., and about 595° F., respectively.

A die 314 is attached near the second end 306b of the barrel 306 via an adapter 316. A slit 318 is formed in a downward facing surface of the die 314. In some embodiments, the slit 318 has a width W1 of about 26⅝ inches. Another heating element 320 is disposed around an outside of the die 314 and/or the adapter 316 for increasing a temperature of the resin 302 to the extrusion temperature, which is about equal to the melt temperature of the resin 302 or greater. In some embodiments, the melt temperature is about 600° F. or greater. In at least one embodiment, the melt temperature is about 500° F. or greater.

Extrusion Coating Processes

Figure 3C:
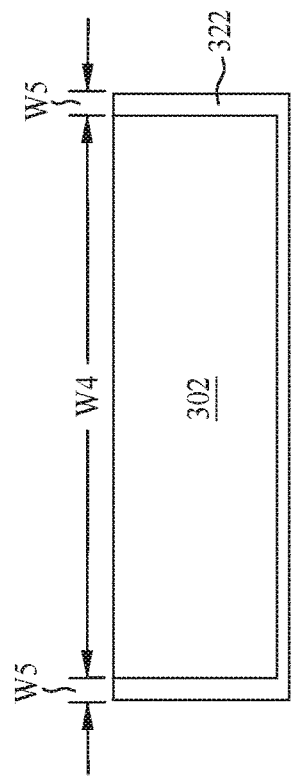
FIG. 3C is a top view along line 3C of FIG. 3A illustrating a substrate after being coated with an LDPE during an extrusion coating process, according to an embodiment.
Figure 3B:
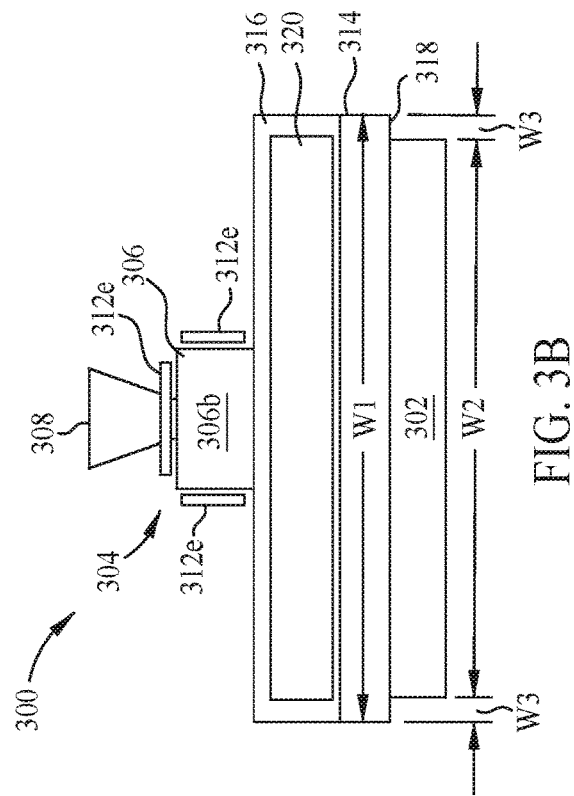
FIG. 3B is a side view along line 3B of FIG. 3A illustrating an extrusion coating apparatus during an extrusion coating process, according to an embodiment.

FIG. 3B is a side view along line 3B of FIG. 3A illustrating the extrusion coating apparatus 300 during an extrusion coating process, according to an embodiment. Referring to FIGS. 3A-3B collectively, in practice, heated resin 302 from the barrel 306 is moved through the adapter 316 to the die 314 where additional heating occurs to reach the extrusion temperature. The resin 302 then exits the die 314 through the slit 318 forming the resin 302 into a thin sheet, or curtain. Dimensions of the extruded resin 302 depend on a design of the slit 318 and also on properties of the resin 302. In some embodiments, a width W2 of the extruded resin 302 may be about equal to the width W1 or less, such as from about 18 inches to about 24 inches, such as from about 20 inches to about 22.5 inches, such as about 22.5 inches. In some embodiments, a gap between an edge of the extruded resin 302 and an end of the slit 318 may have a width W3 of from about 1.5 inches to about 4.0 inches, such as from about 2.0 inches to about 3.5 inches, such as about 2.1 inches. Concurrently, below the die 314, a substrate 322 is pulled over rollers 324 at a suitable line speed. In some embodiments, a line speed is about 500 ft/min or greater, such as from about 500 ft/min to about 1,600 ft/min, such as from about 550 ft/min to about 1,000 ft/min, alternatively from about 1,000 ft/min to about 1,600 ft/min. In some embodiments, a distance H1 between the slit 318 and the substrate 322, or a die gap, is about 27 mils. As the extruded resin 302 contacts the substrate 322, the resin 302 is coated onto the substrate 322 in the form of a thin film.

FIG. 3C is a top view along line 3C of FIG. 3A illustrating the substrate 322 after being coated with the resin 302 during the extrusion coating process, according to an embodiment.

Referring to FIG. 3C, the extruded resin 302 forms a coating having a coating width W4 and a neck-in distance W5, which is a width between an edge of the coated resin 302 and an edge of the substrate 322. In some embodiments, the coating width W4 may be about equal to the width W2 of the extruded resin 302. In some embodiments, the neck-in distance W5 may be about equal to the width W3.

Extrusion Products

Compositions of the present disclosure can be used in coatings (e.g., films or multilayer films) for substrates such as paper, metal, glass, plastic, and any other suitable material. The coatings and/or films can be formed by any suitable extrusion or coextrusion technique. The coatings may be unoriented, uniaxially oriented, or biaxially oriented. Physical properties of the coatings may vary depending on the forming techniques used. A thickness and width of each coating can be measured and recorded manually, and resulting neck-in distance of each side can be calculated.

In at least one embodiment, an extruded coating has a thickness from about 0.1 mil to about 1 mil, such as from about 0.1 mil to about 0.5 mil, such as from about 0.1 mil to about 0.2 mil, such as about 0.125 mil, alternatively from about 0.5 mil to about 1 mil.

In at least one embodiment, a ratio of coating thickness to die gap is about 0.02 or less, such as about 0.01 or less, such as from about 0.001 to about 0.01, such as from about 0.004 to about 0.005, alternatively from about 0.009 to about 0.01.

In at least one embodiment, an extruded coating has a coating width of from about 24 inches to about 72 inches, such as from about 42 inches to about 72 inches, such as from about 60 inches to about 72 inches, alternatively from about 18 inches to about 24 inches, such as from about 20 inches to about 22.5 inches, such as about 22.5 inches.

In at least one embodiment, an extruded coating has a neck-in distance of from about 1.5 inches to about 4 inches, such as from about 2 inches to about 3.5 inches, such as about 2.1 inches.

In at least one embodiment, an extruded coating has a ratio of neck-in distance to coating width of from about 0.08 to about 0.18, such as from about 0.08 to about 0.11, such as from about 0.09 to about 0.1.

In at least one embodiment, an extruded coating has a ratio of coating width to die slit width of from about 0.7 to about 0.9, such as from about 0.75 to about 0.85, such as from about 0.84 to about 0.85.

In at least one embodiment, an extruded coating has a ratio of neck-in distance to die slit width of about 0.05 to about 0.15, such as from about 0.07 to about 0.13, such as about 0.08.

In at least one embodiment, an extruded coating, extruded at a line speed of about 800 ft/min or greater, has a coating width of about 22 inches or greater, such as from about 22 inches to about 23 inches, such as about 22.5 inches.

In at least one embodiment, an extruded coating, extruded at a line speed of about 800 ft/min or greater, has a neck-in distance of about 2.3 inches or less, such as from about 2.0 to about 2.3 inches, such as about 2.1 inches.

In at least one embodiment, an extruded coating, extruded at a line speed of about 800 ft/min or greater, has a ratio of neck-in distance to coating width of about 0.11 or less, such as from about 0.08 to about 0.11, such as from about 0.09 to about 0.1, such as from about 0.091 to about 0.095.

In at least one embodiment, an extruded coating, extruded at a line speed of about 800 ft/min or greater, has a ratio of coating width to die slit width of about 0.82 or greater, such as from about 0.82 to about 0.86, such as from about 0.84 to about 0.85.

In at least one embodiment, an extruded coating, extruded at a line speed of about 800 ft/min or greater, has a ratio of neck-in distance to die slit width of about 0.09 or less, such as from about 0.07 to about 0.09, such as about 0.08.

Polymerization Examples

Methods were performed using at least three different values of propionaldehyde concentration resulting in polymer products IE1, IE2, and IE3. In addition, six commercial LDPEs were characterized, which are CE1, CE2, CE3, CE4, CE5, and CE6. CE1, CE2, CE3, and CE4 are exemplary tubular LDPEs, whereas CE5 and CE6 are exemplary autoclave LDPEs. The results of the characterization are reported in Table 1:

TABLE 1

| | IE1 | IE2 | IE3 | CE1 Commercial Tubular LDPE | CE2 Commercial Tubular LDPE |
|---|---|---|---|---|---|
| MI (g/10 min) | 4.23 | 7.28 | 12.12 | 4.1 | 6.72 |
| Density (g/cc) | 0.9197 | 0.9201 | 0.9205 | 0.919 | 0.9202 |
| Mn (g/mol) | 15,206 | 14,881 | 13,491 | 15,433 | 15,632 |
| Mw (g/mol) | 210,077 | 175,047 | 158,596 | 198,959 | 167,184 |
| Mz (g/mol) | 2,272,283 | 2,431,292 | 2,715,152 | 1,081,200 | 828,065 |
| Mw/Mn | 13.8 | 11.8 | 11.8 | 12.9 | 10.7 |
| Mz/Mw | 10.8 | 13.9 | 17.1 | 5.4 | 5 |
| LCBI (G') | 0.38 | 0.41 | 0.42 | 0.38 | 0.45 |
| ZSV (Pa * s) | 9,309 | 4,596 | 2,491 | 14,720 | 5,707 |
| MS 170° C. (cN) | 11.5 | 7.0 | 5.3 | n/a | 8.8 |

| | CE3 Commercial Tubular LDPE | CE4 Commercial Tubular LDPE | CE5 Commercial Autoclave LDPE | CE6 Commercial Autoclave LDPE |
|---|---|---|---|---|
| MI (g/10 min) | 2.3 | 9.5 | 4.2 | 7.5 |
| Density (g/cc) | 0.919 | 0.919 | 0.921 | 0.921 |
| Mn (g/mol) | 17,000 | 14,000 | 23,000 | 22,000 |
| Mw (g/mol) | 197,000 | 133,000 | 419,000 | 455,000 |
| Mz (g/mol) | 852,000 | 758,000 | 2,210,000 | 2,314,000 |
| Mw/Mn | 10.7 | 9.5 | 18.2 | 20.7 |
| Mz/Mw | 5 | 5.7 | 5.3 | 5.1 |
| LCBI (G') | 0.39 | 0.42 | 0.26 | 0.22 |
| ZSV (Pa * s) | 20,905 | 4,034 | 8,498 | 4,161 |
| MS 170° C. (cN) | 15.1 | n/a | 14.5 | 12.3 |

As shown in Table 1, each of the polymer products IE1, IE2, and IE3 have values of Mz exceeding values of Mz of each of the commercial LDPEs produced by the tubular process (CE1, CE2, CE3, and CE4). In particular, IE1, IE2, and IE3 have Mz values of 2,272,283 g/mol, 2,431,292 g/mol, and 2,715,152 g/mol, respectively, whereas CE1, CE2, CE3, and CE4 have Mz values of 1,081,200 g/mol, 828,065 g/mol, 852,000 g/mol, and 758,000 g/mol, respectively. Thus, each of the Mz values for IE1, IE2, and IE3 exceed the values of Mz for each of the commercial LDPEs produced by the tubular process (CE1, CE2, CE3, and CE4) by at least a factor of two. In some embodiments, the Mz values for IE1, IE2, and IE3 can exceed the values of Mz for commercial LDPEs produced by the tubular process by a factor of about two to about four.

In addition, each of the polymer products IE1, IE2, and IE3 have values of Mz/Mw exceeding values of Mz/Mw of each of the six commercial LDPEs. In particular, IE1, IE2, and IE3 have Mz/Mw values of 10.8, 13.9, and 17.1, respectively, whereas CE1, CE2, CE3, CE4, CE5, and CE6 have Mz/Mw values of 5.4, 5, 5, 5.7, 5.3, and 5.1, respectively. Thus, each of the Mz/Mw values for IE1, IE2, and IE3 exceed the values of Mz/Mw for each of the six commercial LDPEs by at least a factor of two. Moreover, the Mz/Mw value for IE3 exceeds the values of Mz/Mw for each of the six commercial LDPEs by at least a factor of three. Thus, the polymer products IE1, IE2, and IE3 produced by the method 200 have relatively high values of Mz and/or Mz/Mw.

In general, high values of Mz and/or Mz/Mw are characteristic of compositions having distributions of molecular weight with long tails and a relatively high concentration of very large molecular weight chains. Therefore, the polymer products IE1, IE2, and IE3 produced by the method 200 share these properties. Such polymer compositions can be extruded at relatively high rates and to suitable coating width with only moderate levels of neck-in, making IE1, IE2, and IE3 advantageous for extrusion coating applications compared to resins produced with either of the tubular process (CE1, CE2, CE3, and CE4) or the autoclave process (CE5 and CE6).

Comparing IE1 and CE5, which have similar values of melt index, 4.23 and 4.2, respectively, the Mz/Mw value of IE1 is 10.8 compared to an Mz/Mw value of 5.3 for CE5. IE1 and CE5 have similar values of Mz, 2,272,283 g/mol and 2,210,000 g/mol, respectively. Therefore, the difference in values of Mz/Mw is primarily due to Mw values of IE1 and CE5 being 210,077 g/mol and 419,000 g/mol, respectively. Moreover, IE1 has a higher value of LCB index, 0.38 compared to 0.26 for CE5. Therefore, in contrast to the autoclave method, the method 200 produces polymer products having a relatively high concentration of very large molecular weight chains and a greater degree of LCB, each of which contributes advantageously to the use of IE1 for extrusion coating applications.

As shown in Table 1, each polyethylene produced by the method has a density of from about 0.919 g/cm$^3$ to about 0.921 g/cm$^3$; a value of melt index from about 3 g/10 min to about 15 g/10 min; a zero shear viscosity of about 10,000

Pa*s or less; a ratio of Mz to Mw from about 8 to about 15; a value of Mz from about 2,000,000 g/mol to about 3,000,000 g/mol; and a multipeak Mw distribution.

Figure 4A:
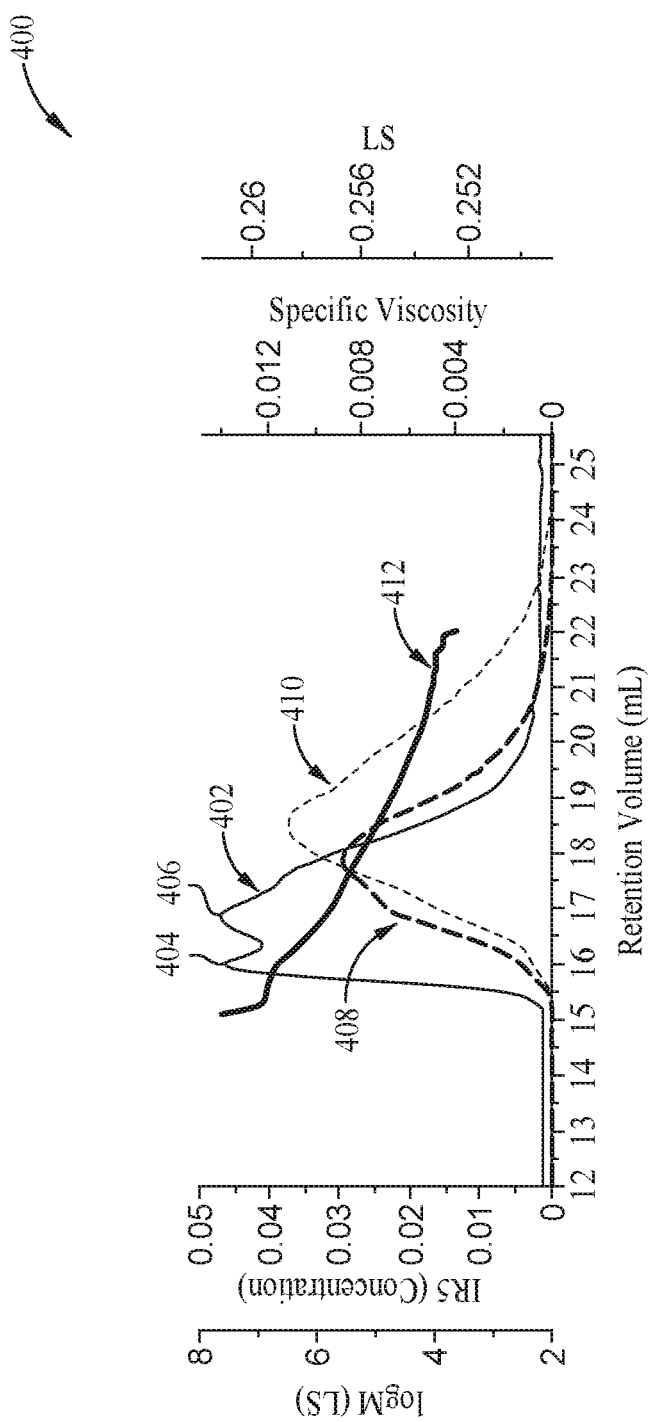
FIG. 4A is a plot illustrating light scattering gel permeation chromatography (GPC) data for an exemplary LDPE produced using the method of FIG. 2, according to an embodiment.

FIG. 4A is a plot 400 illustrating light scattering gel permeation chromatography (GPC) data 402 for an exemplary LDPE produced using the method 200 of FIG. 2, according to an embodiment. Referring to FIG. 4A, each of the polymer products IE1, IE2, and IE3 exhibits a chromatograph with multiple peaks including a distinct high molecular weight peak 404 and another low molecular weight peak 406. The chromatograph provides the first peak 406 and a second peak 404 having a trough between the peaks. The trough has a minimum value less than the peak values of each of peaks 406 and 404.

In contrast, none of the commercial LDPEs which were tested exhibited a chromatograph having such a peak distribution, and none had a high molecular weight peak. Such differences between polymers produced by the method 200 compared to either of the tubular process (CE1, CE2, CE3, and CE4) or the autoclave process (CE5 and CE6) are consistent with findings for Mz, Mz/Mw, and LCB index described above. FIG. 4A also displays specific viscosity 408, concentration (IR5) 410, and calibration (log M) 412 data for an exemplary polymer produced using the method 200.

Figure 4B:
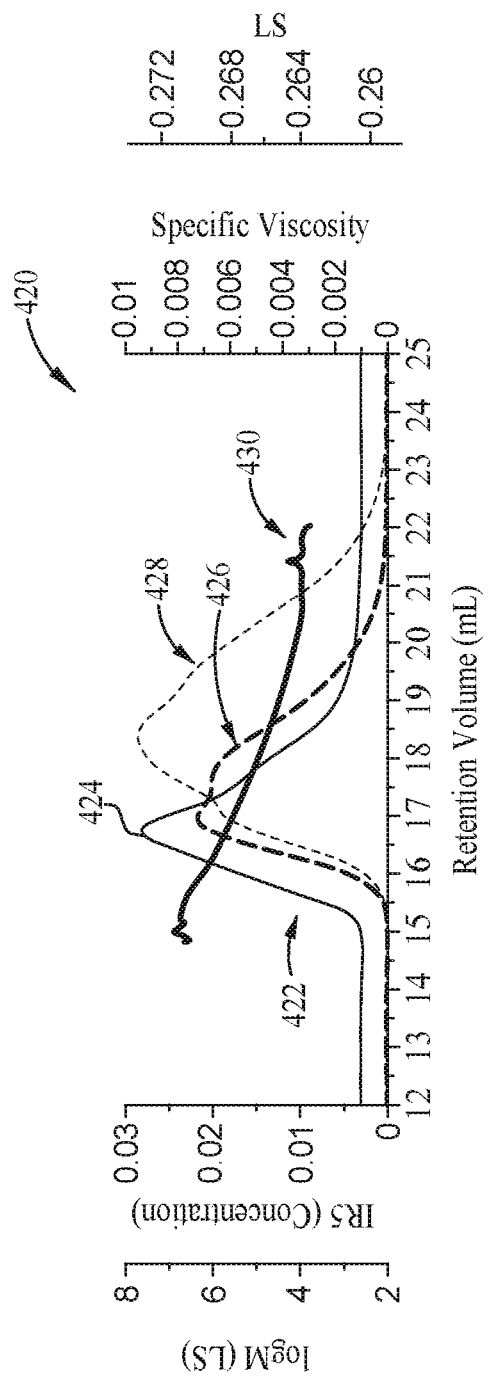
FIG. 4B is a light scattering chromatogram for a commercial tubular LDPE, according to an embodiment.

FIG. 4B is a light scattering chromatogram 420 for a commercial tubular LDPE, according to an embodiment. The chromatogram 420 is representative of the resin CE1 produced by a tubular process. As mentioned above, in contrast to the GPC chromatograph shown in FIG. 4A, the GPC data 422 has only a single molecular peak 424. FIG. 4B also displays specific viscosity 426, concentration (IR5) 428, and calibration (log M) 430 data for the resin CE1.

Figure 4C:
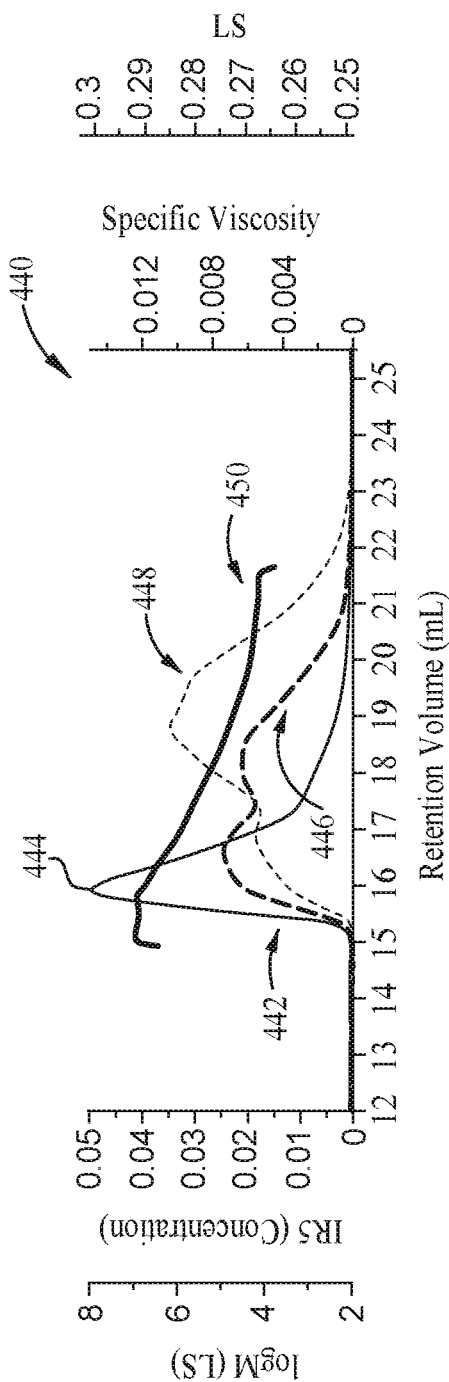
FIG. 4C is a light scattering chromatogram for a commercial autoclave LDPE, according to an embodiment.

FIG. 4C is a light scattering chromatogram 440 for a commercial autoclave LDPE, according to an embodiment. The chromatogram 440 is representative of the resin CE6 produced by an autoclave process. As mentioned above, in contrast to the chromatograph shown in FIG. 4A, the GPC data 442 has only a single molecular weight peak 444. FIG. 4C also displays specific viscosity 446, concentration (IR5) 448, and calibration (log M) 450 data for the resin CE6.

Extrusion Coating Examples

The extrusion coating apparatus 400 was used to test extrusion coating of the polymer product IE1 compared to the commercial resin CE5. The polymer product IE1, produced by the method 200 of the present disclosure, is a polyethylene having a melt index of about 4.23 g/10 min, a density of about 0.9197 g/cm$^3$, an Mn of about 15,206 g/mol, an Mw of about 210,077 g/mol, an Mz of about 2,272,283 g/mol, a ratio of Mw/Mn of about 13.8, a ratio of Mz/Mw of about 10.8, an LCB index of about 0.38, a ZSV of about 9,309 Pa*s, and a melt strength of about 11.5 cN. For comparison, the commercial resin CE5, produced by the autoclave process, is a polyethylene having a melt index of about 4.2 g/10 min, a density of about 0.921 g/cm$^3$, an Mn of about 23,000 g/mol, an Mw of about 419,000 g/mol, an Mz of about 2,210,000 g/mol, a ratio of Mw/Mn of about 18.2, a ratio of Mz/Mw of about 5.3, an LCB index of about 0.26, a ZSV of about 8,498 Pa*s, and a melt strength of about 14.5 cN.

The extrusion coating apparatus 400 was further used to test extrusion coating of the polymer product IE2 compared to the commercial resin CE6. The polymer product IE2, produced by a method of the present disclosure, is a polyethylene having a melt index of about 7.28 g/10 min, a density of about 0.9201 g/cm$^3$, an Mn of about 14,881 g/mol, an Mw of about 175,047 g/mol, an Mz of about 2,431,292 g/mol, a ratio of Mw/Mn of about 11.8, a ratio of Mz/Mw of about 13.9, an LCB index of about 0.41, a ZSV of about 4,596 Pa*s, and a melt strength of about 7.0 cN. For comparison, the commercial resin CE5, produced by the autoclave process, is a polyethylene having a melt index of about 7.5 g/10 min, a density of about 0.921 g/cm$^3$, an Mn of about 22,000 g/mol, an Mw of about 455,000 g/mol, an Mz of about 2,314,000 g/mol, a ratio of Mw/Mn of about 20.7, a ratio of Mz/Mw of about 5.1, an LCB index of about 0.22, a ZSV of about 4,161 Pa*s, and a melt strength of about 12.3 cN.

Extruder output can be fixed by setting screw speed to 88 rpm. Line speed can be adjusted to study neck-in and draw-down in order to assess the usability of the polymer product IE1 for high-rate extrusion. Coating thickness can be about 1 mil at a line speed of 200 ft/min. Coating widths W4 can be measured and recorded manually, and resulting neck-in distance W5 of each side can be calculated. The extrusion process can be performed without using an edge bead reduction mechanism. The results of the test are reported in Table 2:

TABLE 2

| Line speed (ft/min) | Screw speed (rpm) | CE5 Coating width (inches) | CE5 Neck-in (inches) | IE1 Coating width (inches) | IE1 Neck-in (inches) |
|---|---|---|---|---|---|
| 200 | 88 | 24 | 1.3 | 20 | 3.3 |
| 300 | 88 | | | 21.25 | 2.7 |
| 400 | 88 | 24.5 | 1.1 | 21.5 | 2.6 |
| 500 | 88 | | | 21.75 | 2.4 |
| 600 | 88 | 24.5 | 1.1 | 22 | 2.3 |
| 700 | 88 | | | 22.5 | 2.1 |
| 800 | 88 | melt tearing | | 22.5 | 2.1 |
| 900 | 88 | | | 22.5 | 2.1 |
| 1000 | 88 | | | 22.5 | 2.1 |
| 1100 | 88 | | | 22.5 | 2.1 |

| Line speed (ft/min) | Screw speed (rpm) | Calculated thickness (mil) | Coating width (inches) CE5 | Coating width (inches) IE1 | Coating width (inches) CE6 | Coating width (inches) IE2 | IE1/IE2 (60/40) |
|---|---|---|---|---|---|---|---|
| 200 | 88 | 1 | 24 | 20 | 25 | 16.75 | 19.5 |
| 300 | 88 | 0.67 | | 21.25 | | 16.5 | 19.5 |
| 400 | 88 | 0.5 | 24.5 | 21.5 | 24.75 | 16.5 | 20 |
| 500 | 88 | 0.4 | | 21.75 | | 17.5 | 20.5 |
| 600 | 88 | 0.33 | 24.5 | 22 | 24.75 | 18 | 20.75 |
| 700 | 88 | 0.29 | | 22.5 | | 18.5 | 21 |
| 800 | 88 | 0.25 | melt tearing | 22.5 | melt tearing | 19 | 21.5 |
| 900 | 88 | 0.22 | | 22.5 | | 19.5 | 21.5 |
| 1000 | 88 | 0.20 | | 22.5 | | | |
| 1100 | 88 | 0.18 | | 22.5 | | | |

In addition to the results shown in Table 2, some test polymers were observed qualitatively for their melt curtain behavior during extrusion, when extruded at their highest recorded speed. In that regard, the following behaviors were observed: IE1 demonstrated wobble in a center of the melt curtain at 1100 ft/min; IE2 demonstrated some edge weaving at 900 ft/min; and IE1/IE2 demonstrated some edge weaving at 900 ft/min.

As shown in Table 2, CE5 suffered melt tearing at line speeds of about 800 ft/min or greater. However, IE1 could be extruded at line speeds up to at least 1100 ft/min without tearing. Although IE1 has a higher neck-in (i.e., lower coating width) than CE5, especially at low speed, this is not a problem since an additional step is always required to coat sides of the substrate 422 whether using CE5 or IE1.

Moreover, a neck-in of 3.3 inches at line speed of 200 ft/min, and likewise, a neck-in of 2.1 inches at line speed of 700 ft/min or greater, for IE1, may be lower than a neck-in of conventional commercial tubular resins tested under the same conditions. Furthermore, IE1 showed improved neck-in (i.e., higher coating width) at higher line speeds, where neck-in was only 2.1 inches and coating width was 22.5 inches at a line speeds of 700 ft/min to 1,100 ft/min. Thus, IE1 presents an advantageous balance of being extrudable at high speed with only moderate neck-in and suitable coating width. Thus, the results shown in Table 2 demonstrate improvement in processability of IE1 for extrusion coating applications, such as for high-rate extrusion. Based on the above characterization, these improvements are primarily attributed to IE1 having, at a given melt index and density, increased MWD, increased values of Mz, increased values of Mz/Mw, and/or a higher degree of LCB.

As further shown in Table 2, CE6 suffered melt tearing at line speeds of about 800 ft/min or greater. However, IE2 could be extruded at line speeds up to at least 900 ft/min without tearing. Although IE2 has a lower coating width than CE5, especially at low speed, this is not a problem since an additional step is always required to coat sides of the substrate 422 whether using CE6 or IE2. Moreover, a coating width of 16.75 inches at line speed of 200 ft/min for IE2 may be greater than a coating width of some commercial tubular resins tested under the same conditions. Furthermore, IE2 showed higher coating width at higher line speeds, where coating width was 19.5 inches at a line speed of 900 ft/min. Thus, IE2 presents an advantageous balance of being extrudable at high speed with only moderate neck-in and suitable coating width. Thus, the results shown in Table 2 demonstrate improvement in processability of IE2 for extrusion coating applications, such as for high-rate extrusion. Based on the above characterization, these improvements are primarily attributed to IE2 having, at a given melt index and density, increased MWD, increased values of Mz, increased values of Mz/Mw, and/or a higher degree of LCB.

As further shown in Table 2, a 60/40 blend (by weight) of IE1 and IE2 could be extruded at line speeds up to at least 900 ft/min without tearing.

Additional Aspects

The present disclosure provides, among others, the following embodiments, each of which may be considered as optionally including any alternate aspects.

Clause 1. A polyethylene having:
a density of from about 0.91 g/cm$^3$ to about 0.94 g/cm$^3$;
a value of Mz of about 1,500,000 g/mol or greater; and
a ratio of Mz to Mw of about 7 or greater.

Clause 2. The polyethylene of Clause 1, wherein the polyethylene has a melt index from about 3 g/10 min to about 15 g/10 min, when measured according to ASTM D1238 procedure B.

Clause 3. The polyethylene of Clauses 1 or 2, wherein the polyethylene has a zero shear viscosity of about 10,000 Pa*s or less.

Clause 4. The polyethylene of any of Clauses 1 to 3, wherein the ratio of Mz to Mw is from about 10 to about 18.

Clause 5. The polyethylene of any of Clauses 1 to 4, wherein the value of Mz is from about 2,000,000 g/mol to about 3,000,000 g/mol.

Clause 6. The polyethylene of any of Clauses 1 to 5, wherein, according to a light scattering chromatogram, the polyethylene comprises:

a first peak having a first maximum value;
a second peak having a second maximum value; and
a trough between the first and second peaks, wherein the trough has a minimum value less than each of the first and second maximum values.

Clause 7. The polyethylene of any of Clauses 1 to 6, wherein the polyethylene is formed by a tubular reactor.

Clause 8. The polyethylene of any of Clauses 1 to 7, wherein the polyethylene has an Mn value of about 12,000 g/mol to about 17,000 g/mol.

Clause 9. The polyethylene of any of Clauses 1 to 8, wherein the polyethylene has an Mw value of about 140,000 g/mol to about 230,000 g/mol.

Clause 10. The polyethylene of any of Clauses 1 to 9, wherein the polyethylene consists of ethylene derived units.

Clause 11. A process for producing low density polyethylene (LDPE) in a tubular reactor comprising first and second reaction zones, the process comprising:
introducing a first feed stream comprising ethylene monomer and a first free radical initiator to a first inlet of the first reaction zone, wherein the first reaction zone has a first inlet temperature; and
introducing a second feed stream comprising ethylene monomer and a second free radical initiator to a second inlet of the second reaction zone, wherein the second reaction zone has a second inlet temperature that is the same or different than the first inlet temperature, wherein:
each of the first and second inlet temperatures is below about 150° C., each of the first and second reaction zones has a pressure below about 3100 barg, and/or the first free radical initiator is the same or different than the second free radical initiator.

Clause 12. The process of Clause 11, wherein each of the first and second inlet temperatures is below about 140° C. and the pressure in each of the first and second reaction zones is below about 2300 barg.

Clause 13. The process of Clauses 11 or 12, wherein the second reaction zone has a second inlet temperature greater than the first inlet temperature.

Clause 14. The process of any of Clauses 11 to 13, wherein the first inlet temperature is from about 130° C. to about 140° C., and wherein the second inlet temperature is from about 130° C. to about 140° C.

Clause 15. The process of any of Clauses 11 to 14, wherein:
the pressure of the first reaction zone and the pressure of the second reaction zone are each from about 1500 barg to about 2300 barg.

Clause 16. The process of any of Clauses 11 to 15, further comprising introducing a free radical chain transfer agent to at least one of the first reaction zone or the second reaction zone.

Clause 17. The process of any of Clauses 11 to 16, wherein the free radical chain transfer agent is selected from the group consisting of: propionaldehyde, an aromatic hydrocarbon, a thiol, a disulfide, a halogen compound, and combination(s) thereof.

Clause 18. The process of any of Clauses 11 to 17, wherein the free radical initiator is selected from the group consisting of: oxygen, an organic peroxide, an azo compound, and combination(s) thereof.

Clause 19. The process of any of Clauses 11 to 18, further comprising setting a peak temperature of each of the first and second reactions of from about 260° C. to about 345° C.

Clause 20. The process of any of Clauses 11 to 19, wherein a mass ratio of ethylene monomer in the first feed stream to ethylene monomer in the second feed stream is about 1.3.

Clause 21. The process of any of Clauses 11 to 20, further comprising:

introducing a third feed stream comprising ethylene monomer and a third free radical initiator to a third inlet of a third reaction zone, wherein the third reaction zone has a third inlet temperature that is independently the same or different than the first and second inlet temperatures, wherein the third free radical initiator is independently the same or different than the first and second free radical initiators;

introducing a fourth feed stream comprising ethylene monomer and a fourth free radical initiator to a fourth inlet of a fourth reaction zone, wherein the fourth reaction zone has a fourth inlet temperature that is independently the same or different than the first, second, and third inlet temperatures, wherein the fourth free radical initiator is independently the same or different than the first, second, and third free radical initiators;

introducing a fifth feed stream comprising ethylene monomer and a fifth free radical initiator to a fifth inlet of a fifth reaction zone, wherein the fifth reaction zone has a fifth inlet temperature that is independently the same or different than the first, second, third, and fourth inlet temperatures, wherein the fifth free radical initiator is independently the same or different than the first, second, third, and fourth free radical initiators; and introducing a sixth feed stream comprising ethylene monomer and a sixth free radical initiator to a sixth inlet of a sixth reaction zone, wherein the sixth reaction zone has a sixth inlet temperature that is independently the same or different than the first, second, third, fourth, and fifth inlet temperatures, wherein the sixth free radical initiator is independently the same or different than the first, second, third, fourth, and fifth free radical initiators; wherein:

each of the third, fourth, fifth, and sixth inlet temperatures is independently below about 150° C., and/or each of the third, fourth, fifth, and sixth reaction zones independently has a pressure below about 3100 barg.

Clause 22. A process for extrusion coating a polyethylene onto a substrate comprising:

providing a coating line including an extrusion die;

heating the extrusion die and the polyethylene at a first temperature at or above a melt temperature of the polyethylene, wherein the polyethylene comprises:

a density of from about 0.91 g/cm$^3$ to about 0.94 g/cm$^3$;

a value of Mz of about 1,500,000 g/mol or greater; and a ratio of Mz to Mw of about 7 or greater;

operating the coating line at a first line speed of about 500 ft/min or greater;

extruding the polyethylene through the extrusion die; and casting the extruded polyethylene onto the substrate without tearing.

Clause 23. The process of Clause 22, wherein casting the extruded polyethylene onto the substrate without tearing comprises forming a film having a ratio of neck-in distance to coating width of about 0.11 or less.

Clause 24. The process of Clauses 22 or 23, wherein casting the extruded polyethylene onto the substrate without tearing comprises forming a film having a ratio of coating thickness to die gap of about 0.01 or less.

Clause 25. The process of any of Clauses 22 to 24, wherein the first line speed is from about 1,000 ft/min to about 1,600 ft/min.

Overall, the present disclosure provides methods and apparatus that can provide LDPEs having increased MWD, increased values of Mz, increased values of Mz/Mw, and/or a higher degree of LCB, and the LDPE can be extruded at greater speed, as compared to conventional tubular and autoclave produced LDPEs.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A polyethylene having:
   (a) a density of from about 0.91 g/cm$^3$ to about 0.94 g/cm$^3$;
   (b) an Mn value of about 12,000 g/mol to about 17,000 g/mol;
   (c) an Mw value of about 140,000 g/mol to about 230,000 g/mol;
   (d) a value of Mz of from about 2,000,000 g/mol to about 3,000,000 g/mol;
   (e) a ratio of Mz to Mw of about 10 to about 18;
   (f) a melt index ($I_2$) from about 3 g/10 min to about 15 g/10 min, when measured according to ASTM D1238 procedure B (190° C., 2.16 kg); and
   (g) a zero shear viscosity of about 10,000 Pa*s or less.

2. The polyethylene of claim 1, wherein, according to a light scattering chromatogram, the polyethylene comprises:
   a first peak having a first maximum value;

a second peak having a second maximum value; and
a trough between the first and second peaks, wherein the trough has a minimum value less than each of the first and second maximum values.

3. The polyethylene of claim 1, wherein the polyethylene is formed by a tubular reactor.

4. The polyethylene of claim 1, wherein the polyethylene consists of ethylene derived units.

\* \* \* \* \*